United States Patent
Baumgarte (10) Patent No.: US 12,217,562 B2
(45) Date of Patent: Feb. 4, 2025

(54) TECHNOLOGIES FOR USING NFC OR QR CODE TO COMMISSION A DEVICE TO THE CLOUD

(71) Applicant: Schlage Lock Company LLC, Carmel, IN (US)

(72) Inventor: Joseph W. Baumgarte, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 459 days.

(21) Appl. No.: 17/531,179

(22) Filed: Nov. 19, 2021

(65) Prior Publication Data

US 2023/0162551 A1    May 25, 2023

(51) Int. Cl.
| | |
|---|---|
| G07C 9/27 | (2020.01) |
| G07C 9/00 | (2020.01) |
| G07C 9/22 | (2020.01) |
| H04L 9/08 | (2006.01) |

(52) U.S. Cl.
CPC ........... G07C 9/27 (2020.01); G07C 9/00309 (2013.01); G07C 9/22 (2020.01); H04L 9/0825 (2013.01); G07C 2009/00412 (2013.01); G07C 2009/00769 (2013.01); H04L 2209/80 (2013.01)

(58) Field of Classification Search
CPC ........ G07C 9/27; G07C 9/00309; G07C 9/22; G07C 2009/00412
See application file for complete search history.

(56) References Cited

U.S. PATENT DOCUMENTS

| | | | | |
|---|---|---|---|---|
| 2012/0280790 | A1* | 11/2012 | Gerhardt | H04L 63/0428 340/5.61 |
| 2014/0051407 | A1* | 2/2014 | Ahearn | G07C 9/00174 455/414.1 |
| 2019/0327098 | A1* | 10/2019 | Hart | E05B 45/06 |
| 2022/0207938 | A1* | 6/2022 | Chun | H04L 9/30 |

* cited by examiner

*Primary Examiner* — Nabil H Syed
(74) *Attorney, Agent, or Firm* — Taft Stettinius & Hollister LLP (57) ABSTRACT

A method of commissioning an access control device to an access control system according to one embodiment includes, by the access control system, receiving a public cryptographic key of a cryptographic key pair from a cryptography circuit manufacturer device, wherein at least the private cryptographic key of the public cryptographic key pair is stored in the cryptography circuit of the access control device; generating commissioning data for in-field commissioning of the access control device in response to receiving the public cryptographic key, wherein the commissioning data for the access control device is associated with a unique identifier located on the access control device; receiving a request from a mobile device for the commissioning data in response to the mobile device scanning the unique identifier on the access control device; and transmitting the commissioning data to the mobile device for transmittal to the access control device.

20 Claims, 3 Drawing Sheets

TECHNOLOGIES FOR USING NFC OR QR CODE TO COMMISSION A DEVICE TO THE CLOUD

BACKGROUND

Access control systems typically involve the use of credentials to interact with an access control device (e.g., a lock device). Such credentials may be assigned to a particular user or device and are often physical in nature, forming at least a portion of, for example, a smartcard, proximity card, key fob, token device, or mobile device. Thus, credential systems generally require an interaction between the credential and a reader device (e.g., on or secured to the access control device) such that the reader device may read the credential and determine whether access should be granted. In particular, a user may be required to swipe, tap, or otherwise present the credential to the reader device.

Credential management systems are often communicatively coupled to an access control device to commission the access control device after installation and then subsequently manage various configuration data including, for example, user access permissions associated with various credentials. However, various access control devices operate in an "offline" or "unconnected" mode in which those access control devices do not have access to the internet, and in some circumstances, the access control devices are located where no device has internet access. Accordingly, in some circumstances, access control devices must be removed from a door, taken to a place with connectivity so that they can be commissioned, and re-installed on the door before they can be put into service. Although these circumstances are relatively rare, they tend to be extremely inefficient and limiting.

SUMMARY

One embodiment is directed to a unique system, components, and methods for commissioning an access control device to an access control system. Other embodiments are directed to apparatuses, systems, devices, hardware, methods, and combinations thereof for commissioning an access control device to an access control system.

According to an embodiment, a method of commissioning an access control device to an access control system may include receiving, by the access control system, a public cryptographic key of a cryptographic key pair from a cryptography circuit manufacturer device associated with manufacture of a cryptography circuit of the access control device, wherein the cryptographic key pair includes the public and a corresponding private cryptographic key, and wherein at least the private cryptographic key is stored in the cryptography circuit of the access control device, generating, by the access control device, commissioning data for in-field commissioning of the access control device in response to receiving the public cryptographic key, wherein the commissioning data for the access control device is associated with a unique identifier located on the access control device, receiving, by the access control system, a request from a mobile device for the commissioning data in response to the mobile device scanning the unique identifier on the access control device, and transmitting, by the access control system, the commissioning data to the mobile device for transmittal to the access control device.

In some embodiments, receiving the public cryptographic key may include receiving a cryptographic public key certificate including the public cryptographic key.

In some embodiments, the unique identifier may be a uniform resource identifier for the access control system associated with the commissioning data for the access control device.

In some embodiments, the unique identifier may be stored on an NFC tag of the access control device.

In some embodiments, the unique identifier may be included in a QR code of the access control device.

In some embodiments, the commissioning data may include at least one of a firmware upgrade for the access control device, an updated cryptographic key certificate for the access control device, access control keys for the access control device, or access metadata for the access control device.

In some embodiments, the access control system may be or include a cloud-based server.

In some embodiments, generating the commissioning data for in-field commissioning of the access control device may include creating a device twin in the cloud-based server for the access control device.

In some embodiments, the access control device may be an offline access control device without internet access.

In some embodiments, the mobile device may be a first mobile device, and the method may further include transmitting, by the access control system, the commissioning data to a plurality of mobile devices including the first mobile device.

In some embodiments, the method may further include scanning, by the mobile device, the unique identifier on the access control device, and automatically communicating, by the mobile device, with the access control system in response to scanning the unique identifier on the access control device.

In some embodiments, the method may further include storing, by the mobile device, the commissioning data in a memory of the mobile device in response to communicating with the access control system, and transmitting, by the mobile device, the commissioning data to the access control device to commission the access control device.

According to another embodiment, an access control system for commissioning an access control device may include at least one processor and at least one memory comprising a plurality of instructions stored thereon that, in response to execution by the at least one processor, causes the access control system to receive a public cryptographic key of a cryptographic key pair from a cryptography circuit manufacturer device associated with manufacture of a cryptography circuit of the access control device, wherein the cryptographic key pair includes the public and a corresponding private cryptographic key, and wherein at least the private cryptographic key is stored in the cryptography circuit of the access control device, generate commissioning data for in-field commissioning of the access control device in response to receipt of the public cryptographic key, wherein the commissioning data for the access control device is associated with a unique identifier located on the access control device, receive a request from a mobile device for the commissioning data in response to the mobile device scanning the unique identifier on the access control device, and transmit the commissioning data to the mobile device for transmittal to the access control device.

In some embodiments, to receive the public cryptographic key may include to receive a cryptographic public key certificate including the public cryptographic key.

In some embodiments, the unique identifier may be a uniform resource identifier for the access control system associated with the commissioning data for the access control device.

In some embodiments, the unique identifier may be stored on an NFC tag of the access control device.

In some embodiments, the unique identifier may be included in a QR code of the access control device.

In some embodiments, the commissioning data may include at least one of a firmware upgrade for the access control device, an updated cryptographic key certificate for the access control device, access control keys for the access control device, or access metadata for the access control device.

In some embodiments, the access control system may be or include a cloud-based server.

In some embodiments, to generate the commissioning data for in-field commissioning of the access control device may include to create a device twin in the cloud-based server for the access control device.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Figure 1:
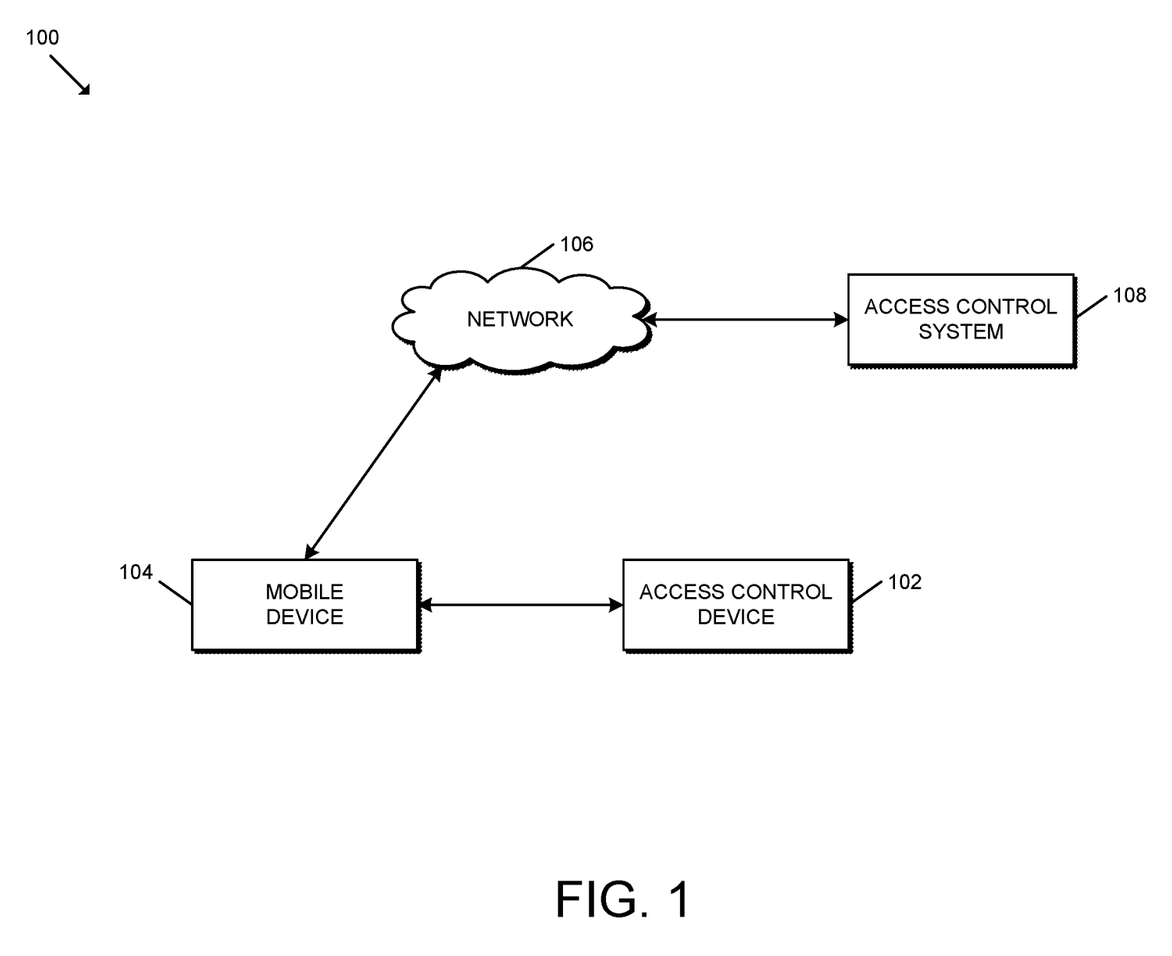
FIG. 1 is a simplified block diagram of at least one embodiment of a system for commissioning an access control device to an access control system.

Referring now to FIG. 1, in the illustrative embodiment, a system 100 for commissioning an access control device 102 to an access control system 108 is shown. The illustrative system 100 includes an access control device 102, a mobile device 104, a network 106, and an access control system 108. As described in greater detail below, the system 100 allows for secure late-binding in either an online or offline state for secure commissioning using items developed in the factory and without requiring cloud/internet connectivity. Further, in various embodiments, the system 100 allows for not placing data into the cloud (e.g., the access control system 108) until the data is necessary, enables the factory not to customize software/firmware (e.g., keys and custom information can be sent only when necessary when the device is live at the customer's site), and/or allows each access control device 102 to be treated as a specific device (e.g., not having the security list of losing a key due to the weakest link in a chain of devices). Additionally, as described in detail below, by using a QR code or NFC tag, the access control device 102 can be pre-registered in the cloud (e.g., the access control system 108), and a device twin for the access control device 102 can be generated, populated, and sent (e.g., in full or part) to the mobile device 104. Accordingly, when the access control device 102 goes live, all of the relevant information can be sent uniquely to that device even if there is no cloud access at that moment.

It should be appreciated that the access control device 102, the mobile device 104, the network 106, and/or the access control system 108 may be embodied as any type of device or collection of devices suitable for performing the functions described herein. More specifically, in the illustrative embodiment, the access control device 102 may be embodied as any type of device capable of controlling access through a passageway. For example, in some embodiments, the access control device 102 may be embodied as an electronic lock (e.g., a mortise lock, a cylindrical lock, or a tubular lock), gate opener, exit device, auto-operator, garage door opener, or a peripheral controller of a passageway. It should be appreciated that the access control device 102 may include a lock mechanism configured to be positioned in a locked state in which access to the passageway is denied, or may be positioned in an unlocked state in which access to the passageway is permitted. In some embodiments, the lock mechanism includes a deadbolt, latch bolt, lever, and/or other mechanism adapted to move between the locked and unlocked state and otherwise perform the functions described herein. Depending on the particular embodiment, the access control device 102 may include a credential reader or be electrically/communicatively coupled to a credential reader configured to communicate with the mobile device 104 to receive commissioning data, configuration updates, access credentials, and/or other relevant access control data.

The access control device 102 may be configured to authenticate various access credentials in order to determine whether a user should be granted access to the passageway secured by the access control device 102. In various embodiments, the access control device 102 may be configured to process passive credentials and/or active credentials depending on the particular embodiment. It should be appreciated that a credential may be "passive" in the sense that the corresponding credential device (e.g., access card) is configured to be powered by radio frequency (RF) signals received from a credential reader. In other words, such passive credentials do not have an independent power source but, instead, rely on power that is induced from RF signals transmitted from other devices in the vicinity of the credential. In particular, in some embodiments, a passive credential may be embodied as a proximity card, which is configured to communicate over a low frequency carrier of nominally 125 kHz, or a smartcard, which is configured to communicate over a high frequency carrier frequency of nominally 13.56 MHz. A credential may be "active" in the sense that the corresponding credential device includes an independent power source (e.g., a battery). For example, the credential may be embodied as a wireless credential (e.g., BLE credential) stored by a mobile device (e.g., a smartphone) in some embodiments. It should be further appreciated that, in some embodiments, the access control device 102 may provide for access via a keypad using a corresponding access code, via a physical key, and/or via other access mechanism.

In the illustrative embodiment, the access control device 102 is configured to wirelessly communicate with the mobile device 104 via a suitable short-range wireless communication connection. For example, in some embodiments, the access control device 102 and the mobile device 104 may communicate via a Bluetooth (e.g., BLE) communication connection and/or an NFC communication connection. In other embodiments, the access control device 102 and the mobile device 104 are configured to communicate via another suitable short-range wireless communication connection. It should be further appreciated that, in some embodiments, the access control device 102 may be an offline device that does not have internet access or other connectivity. Further, the access control device 102 may be located such that the mobile device 104 likewise would not have internet access or other connectivity when located within the short-range wireless communication range of the access control device 102.

The mobile device 104 maybe embodied as any type of mobile device that may be used by an access control integrator to communicate with the access control system 108 to receive commissioning data for the access control device 102, store the commissioning data in memory of the mobile device 104, and subsequently provide the commissioning data to the access control device 102 via the short-range wireless communication connection. In some embodiments, the mobile device 104 may be configured to communicate with the access control device 102 via a wired connection.

The network 106 may be embodied as any type of communication network or connection(s) capable of facilitating communication between the mobile device 104 and remote devices (e.g., the access control system 108). As such, the network 106 may include one or more networks, routers, switches, computers, and/or other intervening devices. For example, the network 106 may be embodied as or otherwise include one or more cellular networks, telecommunication networks, local or wide area networks, publicly available global networks (e.g., the Internet), ad hoc networks, short-range communication links, or a combination thereof.

The access control system 108 may be configured to generate commissioning data and configuration data for various access control devices 102, manage access credentials that may be used to gain access through passageways secured by access control devices 102, and otherwise perform the functions described herein. For example, in some embodiments, the access control system 108 may be responsible for ensuring that the access control devices 102 have updated authorized credentials, whitelists, blacklists, device parameters, and/or other suitable data. Additionally, in some embodiments, the access control system 108 may receive security data, audit data, raw sensor data, and/or other suitable data from the access control devices 102 (e.g., via a mobile device 104) for management of the access control system 108. Further, in some embodiments, the access control system 108 may manage multiple access control devices 102 at a single site (e.g., a particular building) and/or across multiple sites. That is, in such embodiments, the access control system 108 may be configured to receive data related to access control devices 102 distributed across a single building, multiple buildings on a single campus, or across multiple locations. Further, it should be appreciated that some of the access control devices 102 may be online/connected, and other access control devices 102 may be offline/unconnected.

It should be further appreciated that, although the access control system 108 is described herein primarily as a computing system outside of a cloud computing environment, in some embodiments, the access control system 108 may be embodied as a cloud-based device or collection of devices within a cloud computing environment. Further, in cloud-based embodiments, the access control system 108 may be embodied as a server-ambiguous computing solution, for example, that executes a plurality of instructions on-demand, contains logic to execute instructions only when prompted by a particular activity/trigger, and does not consume computing resources when not in use. That is, the access control system 108 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the access control system 108 described herein. For example, when an event occurs (e.g., data is transferred to the access control system 108 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of access control data is made (e.g., via an appropriate user interface to the access control system 108 the appropriate virtual function(s) may be executed to perform the actions before eliminating the instance of the virtual function(s).

It should be appreciated that each of the access control device 102, the mobile device 104, the network 106, and/or the access control system 108 may be embodied as or include a computing device/system similar to the computing system 300 described below in reference to FIG. 3. For example, in the illustrative embodiment, one or more of the access control device 102, the mobile device 104, the network 106, and/or the access control system 108 may include a processing device 302 and a memory 306 having stored thereon operating logic 308 for execution by the processing device 302 for operation of the corresponding device.

Figure 2:
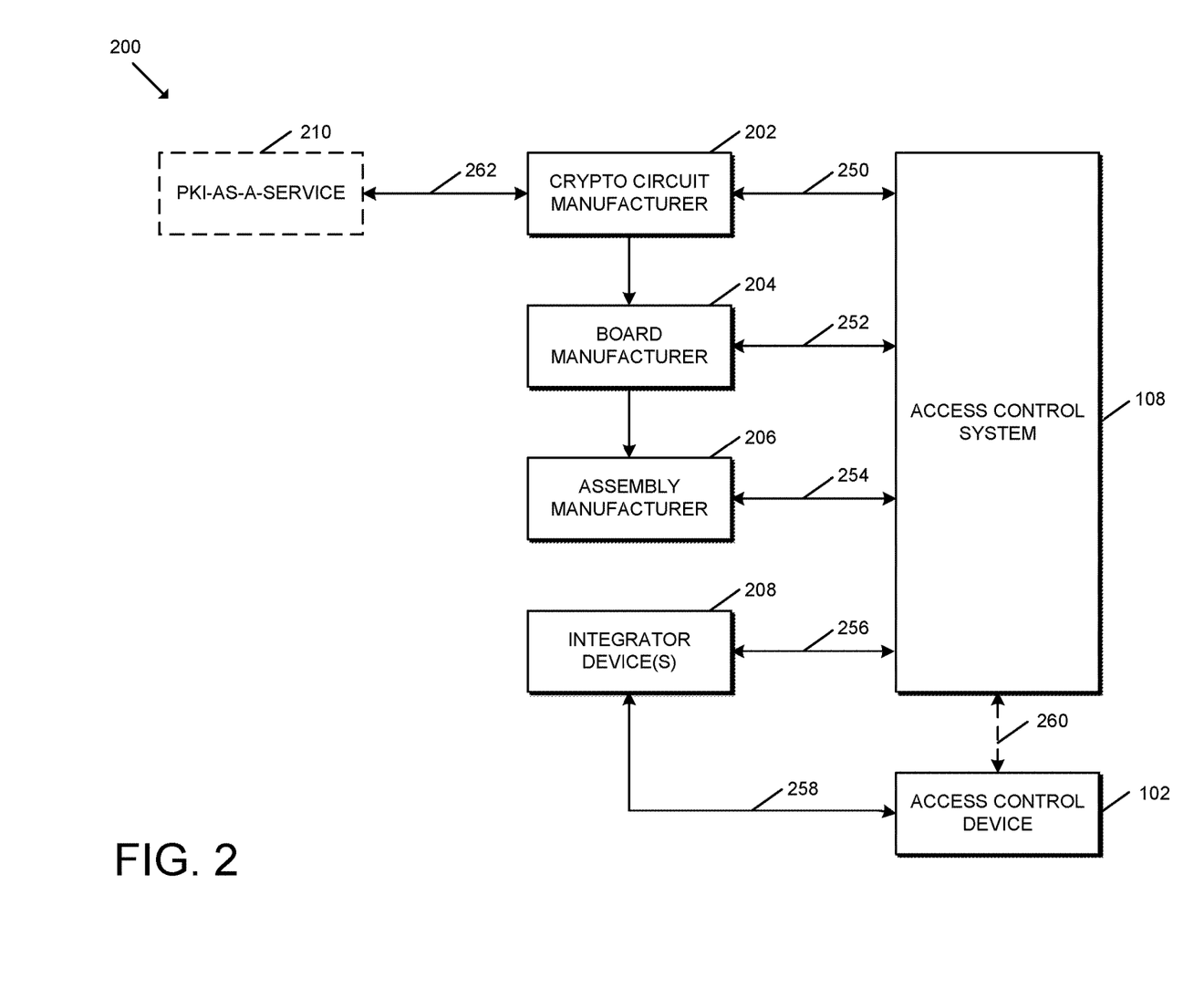
FIG. 2 is a simplified block diagram of at least one embodiment of a system flow for commissioning an access control device to an access control system.

Referring now to FIG. 2, in the illustrative embodiment, a system flow 200 for commissioning an access control device 102 to an access control system 108 is shown. The illustrative system flow 200 includes the access control device 102, the access control system 108, a cryptography circuit manufacturer 202, a board manufacturer 204, an assembly manufacturer 206, and one or more integrator devices 208. Further, in some embodiments, the system flow 200 may include a PKI-as-a-service system 210. For convenience and brevity of the description, it should be appreciated that devices of the cryptography circuit manufacturer 202, the board manufacturer 204, and/or the assembly manufacturer 206 may be referred to simply as the cryptography circuit manufacturer 202, the board manufacturer 204, the assembly manufacturer 206, respectively. Each of the devices of the system flow 200 may be embodied as any type of device or collection of devices suitable for performing the functions described herein.

It should be appreciated that the cryptography circuit manufacturer 202 may be an entity that manufactures a cryptography circuit (e.g., for on-board cryptography) to be included in the access control device 102. In some embodiments, the cryptography circuit may be embodied as an elliptical curve cryptography (ECC) integrated circuit; however, it should be appreciated that another type of cryptography circuit may be included in the access control device 102 in other embodiments. Similarly, although PKI is described herein, other cryptographic architectures may be used in other embodiments. For example, in some embodiments, one or more quantum-resistant cryptography algorithms may be leveraged by the system 100 (e.g., algorithms leveraging a lattice matrix). The board manufacturer 204 may be an entity that manufactures a circuit board for the access control device 102 that includes the cryptography circuit and other electrical components of the access control device 102. The assembly manufacturer 206 may be an entity that assembles the various components of the access control device 102 including, for example, the circuit board(s), escutcheons, lock mechanisms, hardware, and/or other components of the access control device 102. It should be appreciated that the cryptography circuit manufacturer 202, the board manufacturer 204, and the assembly manufacturer 206 may be different entities in some embodiments; however, in other embodiments, two or more of the cryptography circuit manufacturer 202, the board manufacturer 204, and/or the assembly manufacturer 206 may be the same entity.

In the illustrative embodiment, the cryptography circuit manufacturer 202 generates a cryptographic key pair including a public cryptography key and a corresponding private cryptographic key for a particular cryptography circuit manufactured by the cryptography circuit manufacturer 202 and intended for inclusion in an access control device 102. In the illustrative embodiment, the cryptographic key pair (or at least the private cryptographic key of the cryptographic key pair) is stored in the cryptography circuit. In other embodiments, the PKI-as-a-service system 210 may be leveraged to generate the cryptographic key pair and transmit the key pair to the cryptography circuit manufacturer 202 at flow 262.

In some embodiments, in flow 250, the cryptography circuit manufacturer 202 cryptographically signs the public cryptographic key and transmits the signed public cryptographic key to the access control system 108 along with a list of parts manufactured. In other embodiments, the cryptography circuit manufacturer 202 utilizes a hardware security module (HSM) to generate an authentic cryptographic public key certificate that includes the public cryptographic key for the cryptography circuit.

Thereafter, the cryptography circuit may be transported to the board manufacturer 204, and the board manufacturer 204 may incorporate the cryptography circuit into the relevant circuit board/core for the access control device 102. In some embodiments, the board/core may be associated with a unique serial number. Accordingly, in flow 252, the board manufacturer 204 may cryptographically sign the serial number using a cryptographic key of the board manufacturer 204 and transmit the signed serial number to the access control system 108. The board serial number may be transmitted in association with the cryptography circuit serial number in order to maintain continued traceability from the source and provide continuous chain of custody records.

Thereafter, the board including the cryptography circuit may be transported to the assembly manufacturer 206, and the assembly manufacturer 206 may assemble the access control device 102 and initially provision various data to the access control device 102. In some embodiments, the assembly manufacturer 206 may assign a serial number to the assembled access control device 102, and load generic cryptographic keys to the memory of the access control device 102 for operation of a corresponding reader device of the access control device 102. Additionally, in the illustrative embodiment, the assembly manufacturer 206 may print a digital certificate of the access control devices 102 (e.g., the device's DER certificate) as a signed QR code embedded as a URI tag on a portion of the access control device 102 (or packaging thereof). Additionally or alternatively, the assembly manufacturer 206 may store similar data to an NFC tag on the access control device 102 and/or leverage a reader of the access control device 102 as an NFC tag emitter with similar data. In the illustrative embodiment, the URI tag is a unique identifier for the access control system 108 associated with commissioning data for the corresponding access control device 102. Although described as a URI tag specifically, it should be appreciated that another unique identifier may be used in other embodiments. In flow 254, the assembly manufacturer 206 may cryptographically sign the serial number of the access control device 102 assembly (e.g., using the device key) and transmit the signed serial number to the access control system 108. In some embodiments, the assembly serial number may be transmitted in association with the cryptography circuit serial number and the board serial number in order to maintain continued traceability from the source and provide continuous chain of custody records.

The access control system 108 creates a device twin for the access control device 102. It should be appreciated that a device twin is a virtual representation of the access control device 102 within the access control system 108 (e.g., a cloud-based environment) that includes the same configurations, settings, and other data associated with the access control device 102. For example, when a change is made the state of the access control device 102 (e.g., unlock door), a change to the desired state is made to the device twin in the access control system 108 and, when the access control device 102 contacts (e.g., directly or indirectly, depending on the circumstances) the access control system 108 to determine the desired state of the device twin, and that desired state is pushed to the access control device 102. After the access control device 102 updates its state, it responds back to the access control system 108 indicating that the desired state is now the current state of the access control device 102. Additionally, or in creating the device twin, the access control system 108 generates commissioning data for in-field commissioning of the access control device 102. The commissioning data may include, for example, a firmware upgrade for the access control device 102, an updated cryptographic key certificate for the access control device 102, access control keys for the access control device 102, access metadata for the access control device 102, and/or other data associated with commissioning the access control device 102. It should be appreciated that, in some embodiments, all of the steps associated with creating the device twin and generating the commissioning data may be performed without even powering up the access control device 102. It should be further appreciated that the commissioning data may be encrypted by the access control system 108 using the public cryptographic key received from the cryptography circuit manufacturer 202 as described above. In such embodiments, on the access control device 102 that includes the private cryptography key (e.g., stored in the cryptography circuit) associated with the public cryptographic key is able to decrypt and read the commissioning data.

Each of the integrator devices 208 may be embodied as any device configured to communicate with the access control system 108 (e.g., via the internet) and the access control device 102 (e.g., via a short-range wireless communication connection), and otherwise capable of performing the functions described herein. For example, in some embodiments, one or more of the integrator devices 208 may be embodied as the mobile device 104 of FIG. 1.

In the illustrative embodiment, the integrator device 208 (e.g., a mobile device 104) may scan the unique identifier (e.g., QR code) on the access control device 102 (or packaging thereof) or otherwise read the unique identifier. For example, in some embodiments, the integrator device 208 may read an NFC tag or NFC emission including the unique identifier. As indicated above, in some embodiments, the unique identifier includes a URI associated with commissioning data for the access control device 102. Accordingly, in some embodiments, upon scanning/reading the unique identifier, the integrator device 208 may automatically communicate with the access control system 108 (e.g., at the URI) in order to request the commissioning data for the access control device 102 in flow 256. Further, in some embodiments, the integrator device 208 may also transmit the serial number of the cryptography circuit, the serial number of the board, and/or the serial number of the assembly.

The access control system 108 may validate the request, for example, against one or more lists provided during manufacture of the various components described above, determine the appropriate commissioning package to transmit to the integrator device 208, and transmit the commissioning data package to the integrator device 208. The integrator device 208 may store/cache the commissioning data package until the integrator device 208 is within communication range of the access control device 102 and ready to commission the access control device 102. When the access control device 102 is ready to be commissioned and the integrator device 208 is within communication range of the access control device 102, in flow 258, the integrator device 208 transmits the commissioning data to the access control device 102 and begins the commissioning process.

Although the commissioning is described herein as only using a single integrator device 208, it should be appreciated that the system flow 200 may leverage multiple integrator devices 208 in other embodiments. For example, in some embodiments, multiple device integrators may be working in conjunction with one another to commission many access control devices 102 at a particular location (e.g., a large site) or set of locations. Accordingly, in such embodiments, the access control system 108 may transmit the commissioning data package to multiple integrator devices 208 (e.g., each integrator device 208 that could potentially commission the access control device 102), such that the commissioning data is stored on each of the devices 208 for whichever device integrator is ultimately responsible for commissioning the access control device 102. In alternative embodiments, as shown in flow 260, the access control device 102 may include a communication connection with the access control system 108 and be able to receive the commissioning data directly from the access control system 108 without using the integrator device 208 as an intermediary.

It should be appreciated that each of the devices of the system flow 200 may be embodied as a computing device/system similar to the computing system 300 described below in reference to FIG. 3. For example, in the illustrative embodiment, one or more of the devices may include a processing device 302 and a memory 306 having stored thereon operating logic 308 for execution by the processing device 302 for operation of the corresponding device.

Figure 3:
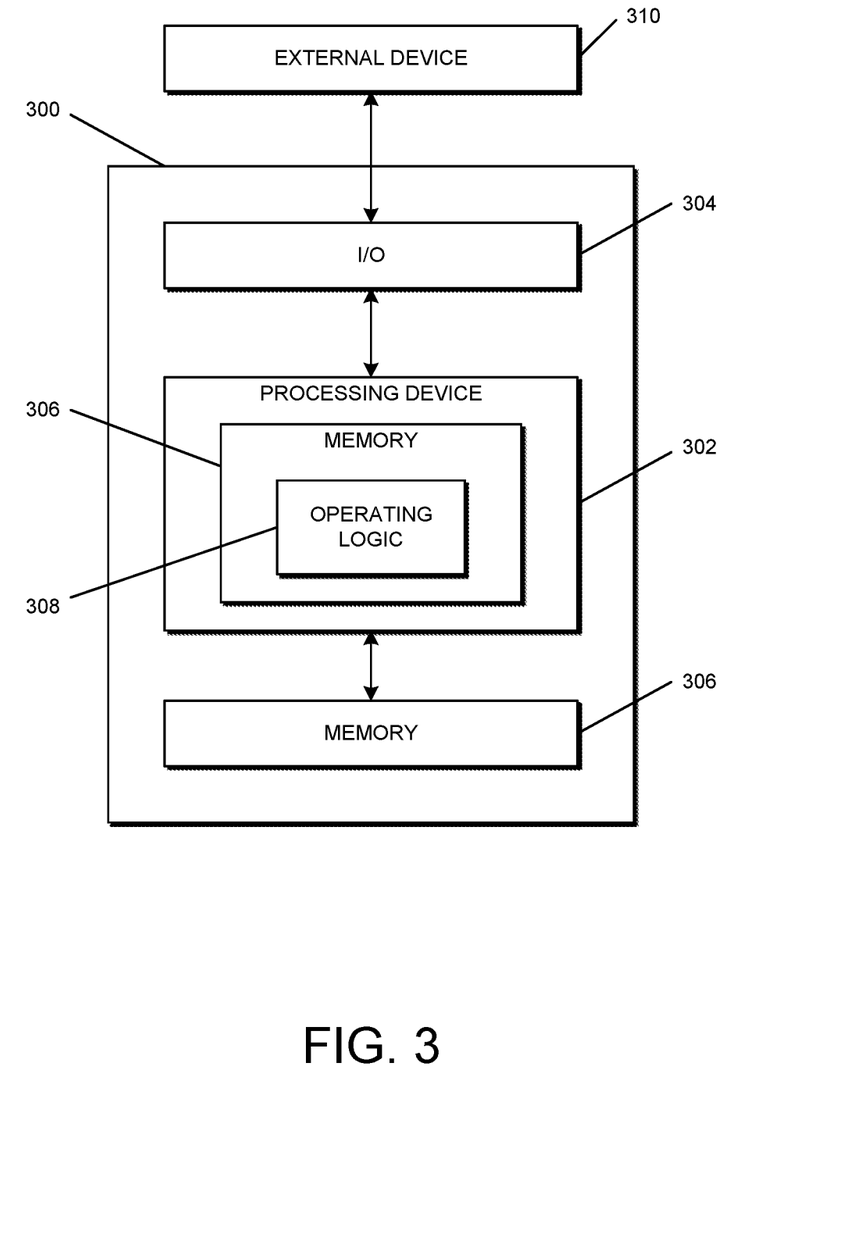
FIG. 3 is a simplified block diagram of at least one embodiment of a computing system.

Referring now to FIG. 3, a simplified block diagram of at least one embodiment of a computing system 300 is shown. The illustrative computing system 300 depicts at least one embodiment of a computing device/system that may be utilized in connection with the access control device 102, the mobile device 104, the network 106, the access control system 108, the integrator device(s) 208, and/or the devices of the cryptography circuit manufacturer 202, the board manufacturer 204, the assembly manufacturer 206, and/or the PKI-as-a-service system 210 illustrated in FIGS. 1-2. Depending on the particular embodiment, the computing system 300 may be embodied as a mobile computing device, server, desktop computer, laptop computer, tablet computer, notebook, netbook, Ultrabook™, cellular phone, smartphone, wearable computing device, onboard vehicle computing system, personal digital assistant, Internet of Things (IoT) device, control panel, router, gateway, and/or any other computing, processing, and/or communication device capable of performing the functions described herein.

The computing system 300 includes a processing device 302 that executes algorithms and/or processes data in accordance with operating logic 308, an input/output device 304 that enables communication between the computing system 300 and one or more external devices 310, and memory 306 which stores, for example, data received from the external device 310 via the input/output device 304.

The input/output device 304 allows the computing system 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, Ultra-Wide Band, etc.) to effect such communication depending on the particular computing device 300. The input/output device 304 may include hardware, software, and/or firmware suitable for performing the techniques described herein.

The external device 310 may be any type of device that allows data to be inputted or outputted from the computing system 300. For example, in various embodiments, the external device 310 may be embodied as one of more of the devices/systems of FIGS. 1-2. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing system 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is of a programmable variety that executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable variety, such as a disk, tape, memory stick, cartridge, and/or other suitable portable memory. In operation, the memory 306 may store various data and software used during operation of the computing system 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing system 300 may form a portion of a system-on-a-chip (SoC) and be incorporated on a single integrated circuit chip.

In some embodiments, various components of the computing system 300 (e.g., the processing device 302 and the memory 306) may be communicatively coupled via an input/output subsystem, which may be embodied as circuitry and/or components to facilitate input/output operations with the processing device 302, the memory 306, and other components of the computing system 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing system 300 may include other or additional components, such as those commonly found in a typical computing device (e.g., various input/output devices and/or other components), in other embodiments. It should be further appreciated that one or more of the components of the computing system 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing system 300 may include multiple processing devices 302, I/O devices 304, and/or memories 306 in other embodiments. Further, in some embodiments, more than one external device 310 may be in communication with the computing system 300.

What is claimed is:

1. A method of commissioning an access control device to an access control system, the method comprising:
receiving, by the access control system, a public cryptographic key of a cryptographic key pair from a cryptography circuit manufacturer device associated with manufacture of a cryptography circuit of the access control device, wherein the cryptographic key pair includes the public and a corresponding private cryptographic key, and wherein at least the private cryptographic key is stored in the cryptography circuit of the access control device;

with the access control system and without powering up the access control device, creating a device twin for the access control device within the access control system, generating commissioning data for in-field commissioning of the access control device in response to receiving the public cryptographic key, and encrypting the commissioning data, wherein the commissioning data for the access control device is associated with a unique identifier located on the access control device;

receiving, by the access control system, a request from a mobile device for the commissioning data in response to the mobile device scanning the unique identifier on the access control device; and transmitting, by the access control system, the commissioning data to the mobile device for transmittal to the access control device.

2. The method of claim 1, wherein receiving the public cryptographic key comprises receiving a cryptographic public key certificate including the public cryptographic key.

3. The method of claim 1, wherein the unique identifier is a uniform resource identifier for the access control system associated with the commissioning data for the access control device.

4. The method of claim 3, wherein the unique identifier is stored on an NFC tag of the access control device.

5. The method of claim 3, wherein the unique identifier is included in a QR code of the access control device.

6. The method of claim 1, wherein the commissioning data comprises at least one of a firmware upgrade for the access control device, an updated cryptographic key certificate for the access control device, access control keys for the access control device, or access metadata for the access control device.

7. The method of claim 1, wherein the access control system comprises a cloud-based server and the device twin is created in the cloud-based server.

8. The method of claim 1, further comprising:
receiving, by the access control system and before assembly of the access control device, a cryptographically signed serial number of a circuit board from a circuit board manufacturer device associated with manufacture of a circuit board of the access control device that incorporates the cryptography circuit, wherein the cryptographically signed serial number is received in association with a serial number of the cryptography circuit incorporated with the circuit board.

9. The method of claim 1, wherein the access control device is an offline access control device without internet access.

10. The method of claim 1, wherein the mobile device comprises a first mobile device; and
further comprising transmitting, by the access control system, the commissioning data to a plurality of mobile devices including the first mobile device.

11. The method of claim 1, further comprising:
scanning, by the mobile device, the unique identifier on the access control device; and
automatically communicating, by the mobile device, with the access control system in response to scanning the unique identifier on the access control device.

12. The method of claim 11, further comprising:
storing, by the mobile device, the commissioning data in a memory of the mobile device in response to communicating with the access control system; and
transmitting, by the mobile device, the commissioning data to the access control device to commission the access control device.

13. An access control system for commissioning an access control device, the access control system comprising:
at least one processor; and
at least one memory comprising a plurality of instructions stored thereon that, in response to execution by the at least one processor, causes the access control system to:
receive a public cryptographic key of a cryptographic key pair from a cryptography circuit manufacturer device associated with manufacture of a cryptography circuit of the access control device, wherein the cryptographic key pair includes the public and a corresponding private cryptographic key, and wherein at least the private cryptographic key is stored in the cryptography circuit of the access control device;
without the access control device being powered up, create a device twin for the access control device within the access control system, generate commissioning data for in-field commissioning of the access control device in response to receipt of the public cryptographic key, and encrypt the commissioning data, wherein the commissioning data for the access control device is associated with a unique identifier located on the access control device;
receive a request from a mobile device for the commissioning data in response to the mobile device scanning the unique identifier on the access control device; and
transmit the commissioning data to the mobile device for transmittal to the access control device.

14. The access control system of claim 13, wherein to receive the public cryptographic key comprises to receive a cryptographic public key certificate including the public cryptographic key.

15. The access control system of claim 13, wherein the unique identifier is a uniform resource identifier for the access control system associated with the commissioning data for the access control device.

16. The access control system of claim 15, wherein the unique identifier is stored on an NFC tag of the access control device.

17. The access control system of claim 15, wherein the unique identifier is included in a QR code of the access control device.

18. The access control system of claim 13, wherein the commissioning data comprises at least one of a firmware upgrade for the access control device, an updated cryptographic key certificate for the access control device, access control keys for the access control device, or access metadata for the access control device.

19. The access control system of claim 13, wherein the access control system comprises a cloud-based server and the device twin is created on the cloud-based server.

20. The access control system of claim 19, wherein the plurality of instruction cause the access control system to:
receive, before assembly of the access control device, a cryptographically signed serial number of a circuit board from a circuit board manufacturer device associated with manufacture of a circuit board of the access control device that incorporates the cryptography circuit, wherein the cryptographically signed serial number is received in association with a serial number of the cryptography circuit incorporated with the circuit board.

* * * * *